(12) United States Patent
Liu et al.

(10) Patent No.: US 12,176,828 B2
(45) Date of Patent: Dec. 24, 2024

(54) ENERGY STORAGE DEVICE AND METHOD THEREOF FOR SUPPLYING POWER

(71) Applicant: Merry Electronics(Shenzhen) Co., Ltd., ShenZhen (CN)

(72) Inventors: Yung-Hsiang Liu, Taichung (TW); Wei-Kang Liang, Taichung (TW); Yu-Kai Wang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 358 days.

(21) Appl. No.: 17/833,912

(22) Filed: Jun. 7, 2022

(65) Prior Publication Data
US 2023/0009022 A1 Jan. 12, 2023

(30) Foreign Application Priority Data

Jul. 6, 2021 (TW) ................................ 110124786
May 18, 2022 (TW) ................................ 111118492

(51) Int. Cl.
*H02H 3/00* (2006.01)
*H02H 3/32* (2006.01)
*H02M 1/32* (2007.01)
*H02M 7/539* (2006.01)

(52) U.S. Cl.
CPC .............. *H02M 7/539* (2013.01); *H02H 3/32* (2013.01); *H02M 1/32* (2013.01)

(58) Field of Classification Search
None
See application file for complete search history.

(56) References Cited

U.S. PATENT DOCUMENTS

| 3,683,198 | A | * | 8/1972 | Thode | H02J 9/062 307/66 |
| 4,316,097 | A | * | 2/1982 | Reynolds | H02J 9/062 187/290 |
| 5,198,698 | A | * | 3/1993 | Paul | H02J 9/08 307/64 |
| 11,233,403 | B2 | * | 1/2022 | Konishi | H02J 3/381 |
| 2012/0139477 | A1 | * | 6/2012 | Oglesbee | H02J 9/005 307/130 |
| 2015/0143897 | A1 | * | 5/2015 | Cummings | G01F 23/74 307/66 |

* cited by examiner

*Primary Examiner* — Stephen W Jackson
(74) *Attorney, Agent, or Firm* — JCIPRNET

(57) ABSTRACT

An energy storage device and a method thereof for supplying power are provided. Control a power conversion circuit to lower an AC output voltage during a preset period to a preset voltage, control the power conversion circuit to change from outputting the preset voltage to outputting a surge voltage, so that the power conversion circuit enters a surge generation period, and determine whether to turn off the energy storage device according to whether an output terminal of the power conversion circuit generating a surge current during the surge generation period.

16 Claims, 4 Drawing Sheets

ENERGY STORAGE DEVICE AND METHOD THEREOF FOR SUPPLYING POWER

CROSS-REFERENCE TO RELATED APPLICATION

This application claims the priority benefit of Taiwan application serial no. 110124786, filed on Jul. 6, 2021, and Taiwan application serial no. 111118492, filed on May 18, 2022. The entirety of each of the above-mentioned patent applications is hereby incorporated by reference herein and made a part of this specification.

BACKGROUND

Technical Field

The disclosure relates to a power device, and in particular relates to an energy storage device and a method thereof for supplying power.

Description of Related Art

An energy storage system uses internal batteries to store electrical energy. When there is a load demand, a power conversion unit (DC/AC converter, DC/AC inverter) converts the direct current stored in the battery into the alternating current required by the load. In the process of electrical energy conversion, power dissipation inevitably occurs. Even when the energy storage system is not connected to the load, as long as the power conversion unit is working, power dissipation occurs, and the continuous power dissipation exhausts the battery power. For example, when a user finishes using the load and removes the load, but does not turn off the output of the energy storage system, the power conversion unit inside the energy storage system continues to operate. After a period of time, if the power dissipation of the power conversion unit exhausts the battery power completely, the battery will have no power for the user to use when the user wants to use it next time.

SUMMARY

The disclosure provides an energy storage device and a method thereof for supplying power, which may accurately determine whether a load has been removed from the energy storage device, and automatically turn off the energy storage device when the load is removed from the energy storage device, thereby effectively reducing power loss.

The energy storage device of the disclosure includes a battery module, a power conversion circuit, a sensing circuit and a control circuit. The battery module provides a DC voltage. The power conversion circuit is coupled to the battery module, and converts the DC voltage into an AC output voltage, to provide the AC output voltage to an output terminal of the power conversion circuit to supply power to a load. The sensing circuit is coupled to the output terminal of the power conversion circuit, and senses a current and a voltage of the output terminal of the power conversion circuit. The control circuit is coupled to the power conversion circuit and the sensing circuit. The control circuit controls the power conversion circuit to lower the AC output voltage during a preset period to a preset voltage. The control circuit controls the power conversion circuit to change from outputting the preset voltage to outputting a surge voltage, such that the power conversion circuit enters a surge generation period. The control circuit determines whether to turn off the energy storage device according to whether the output terminal of the power conversion circuit generates a surge current during the surge generation period.

In an embodiment of the disclosure, the surge current is generated in response to an equivalent capacitance of the load.

In an embodiment of the disclosure, an initial time point of the surge generation period corresponds to a time point when the AC output voltage reaches a peak voltage.

In an embodiment of the disclosure, the preset period is ¼ cycle of the AC output voltage.

In an embodiment of the disclosure, a voltage value of the preset voltage is close to zero.

In an embodiment of the disclosure, the control circuit determines whether the surge current is generated at the output terminal of the power conversion circuit according to whether the current sensed by the sensing circuit is greater than a preset current.

In an embodiment of the disclosure, the control circuit controls the surge voltage generated by the power conversion circuit during the surge generation period to be 1.1 to 1.2 times of a normal peak voltage of the AC output voltage.

In an embodiment of the disclosure, the control circuit controls the power conversion circuit to normally generate the AC output voltage after the surge generation period ends.

The disclosure also provides a method for supplying power of an energy storage device. The energy storage device includes a battery module and a power conversion circuit. The power conversion circuit converts a DC voltage provided by the battery module into an AC output voltage, to provide the AC output voltage to an output terminal of the power conversion circuit to supply power to a load. The method for supplying power of an energy storage device includes the following steps. A current and a voltage of the output terminal of the power conversion circuit are sensed. The power conversion circuit is controlled to lower the AC output voltage during a preset period to a preset voltage. The power conversion circuit is controlled to change from outputting the preset voltage to outputting a surge voltage, so that the power conversion circuit enters a surge generation period. Whether to turn off the energy storage device is determined according to whether the output terminal of the power conversion circuit generates a surge current during the surge generation period.

In an embodiment of the disclosure, the surge current is generated in response to an equivalent capacitance of the load.

In an embodiment of the disclosure, an initial time point of the surge generation period corresponds to a time point when the AC output voltage reaches a peak voltage.

In an embodiment of the disclosure, the preset period is ¼ cycle of the AC output voltage.

In an embodiment of the disclosure, a voltage value of the preset voltage is close to zero.

In an embodiment of the disclosure, the method for supplying power of an energy storage device includes determining whether the surge current is generated at the output terminal of the power conversion circuit according to whether the current sensed by the sensing circuit is greater than a preset current.

In an embodiment of the disclosure, the surge voltage generated by the power conversion circuit during the surge generation period is controlled to be 1.1 to 1.2 times of a normal peak voltage of the AC output voltage.

In an embodiment of the disclosure, the method for supplying power of an energy storage device includes controlling the power conversion circuit to normally generate the AC output voltage after the surge generation period ends.

Based on the above, the embodiments of the disclosure may control the power conversion circuit to lower the AC output voltage during a preset period to a preset voltage. The power conversion circuit is controlled to change from outputting the preset voltage to outputting a surge voltage, so that the power conversion circuit enters a surge generation period, and whether to turn off the energy storage device is determined according to whether an output terminal of the power conversion circuit generates a surge current during the surge generation period. In this way, whether a load has been removed from the energy storage device may be accurately determined, and the energy storage device may be automatically turn off when the load is removed from the energy storage device, thereby effectively reducing power loss.

In order to make the above-mentioned features and advantages of the disclosure comprehensible, embodiments accompanied with drawings are described in detail below.

DETAILED DESCRIPTION OF DISCLOSED EMBODIMENTS

Figure 1:
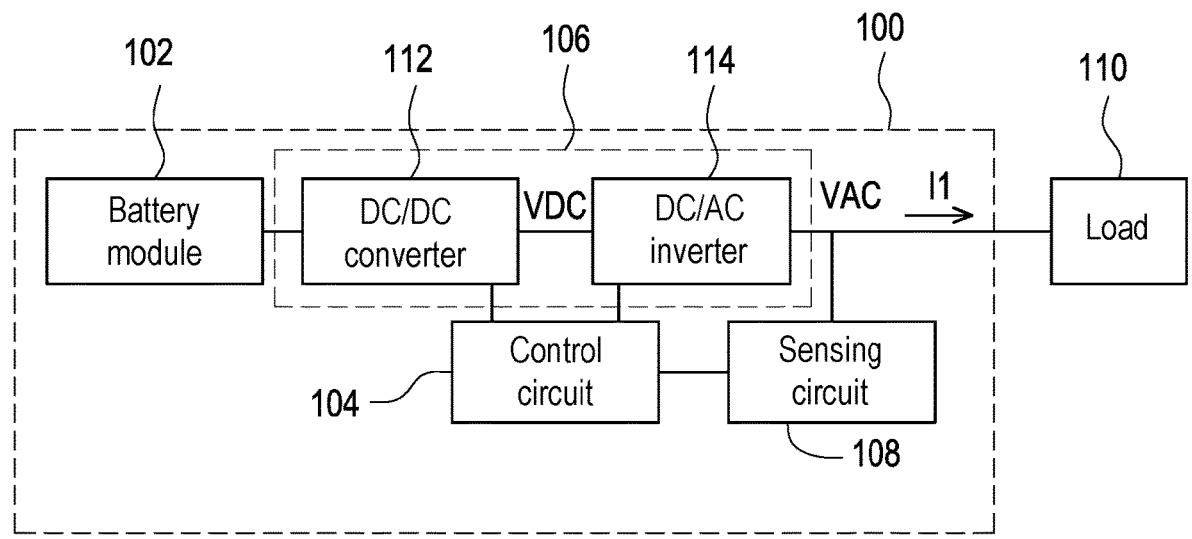
FIG. 1 is a schematic diagram of an energy storage device according to an embodiment of the disclosure.

FIG. 1 is a schematic diagram of an energy storage device according to an embodiment of the disclosure. Referring to FIG. 1, an energy storage device 100 may be a power supply device for supplying power to a load 110. The energy storage device 100 includes a battery module 102, a control circuit 104, a power conversion circuit 106, and a sensing circuit 108. The battery module 102 is coupled to the power conversion circuit 106. The power conversion circuit 106 is coupled to the control circuit 104, and an output terminal of the power conversion circuit 106 is coupled to the sensing circuit 108 and the externally connected load 110 of the energy storage device 100. The control circuit 104 is coupled to the sensing circuit 108.

The power conversion circuit 106 may convert a DC voltage provided by the battery module 102 into an AC output voltage VAC, so as to provide the AC output voltage VAC to the output terminal of the power conversion circuit 106 to supply power to the load 110. Further, as shown in FIG. 1, the power conversion circuit 106 includes a DC/DC converter 112 and a DC/AC inverter 114. The DC/DC converter 112 is coupled to the battery module 102, the control circuit 104, and the DC/AC inverter 114. The DC/AC inverter 114 is coupled to the control circuit 104. The DC/DC converter 112 may convert the DC voltage provided by the battery module 102 into a DC voltage VDC, and provide the DC voltage VDC to the DC/AC inverter 114. The DC/DC converter 112 may be, for example, a boost converter, but is not limited thereto. The DC/AC inverter 114 may convert the DC voltage VDC into the AC output voltage VAC. The sensing circuit 108 may sense the AC output voltage VAC and the current I1 at the output terminal of the power conversion circuit 106, and provide the sensing results to the control circuit 104.

The control circuit 104 may control the power conversion circuit 106 to lower the AC output voltage VAC during a preset period to a preset voltage, and control the power conversion circuit 106 to change from outputting the preset voltage to outputting a surge voltage, so that the power conversion circuit 106 enters a surge generation period. The control circuit 104 determines whether to turn off the energy storage device 100 according to whether an output terminal of the power conversion circuit 106 generates a surge current during the surge generation period. For example, when a surge current is generated during a surge generation period, it means that the load 110 is connected to the energy storage device 100, so the control circuit 104 does not need to turn off the energy storage device 100. When the surge current is not generated during the surge generation period, it means that the load 110 has been removed from the energy storage device 100. The control circuit 104 may turn off the energy storage device 100, for example, the operations of each of the circuits in the energy storage device 100 may be stopped, or only operating the necessary circuits required for the energy storage device 100 with the necessary power to resume normal operation, so as to reduce the power dissipation and save the energy loss of the battery module 102.

Since even when the input capacitance of the load 110 is small, the surge current generated during the surge generation period may still reflect the existence of the load 110, therefore, by determining whether the surge current is generated when passing the surge generation period, it is possible to accurately determine whether the load has been removed from the energy storage device, subsequently the energy storage device 100 may be automatically turned off when the load is removed from the energy storage device, thereby effectively reducing power loss.

Figure 2:
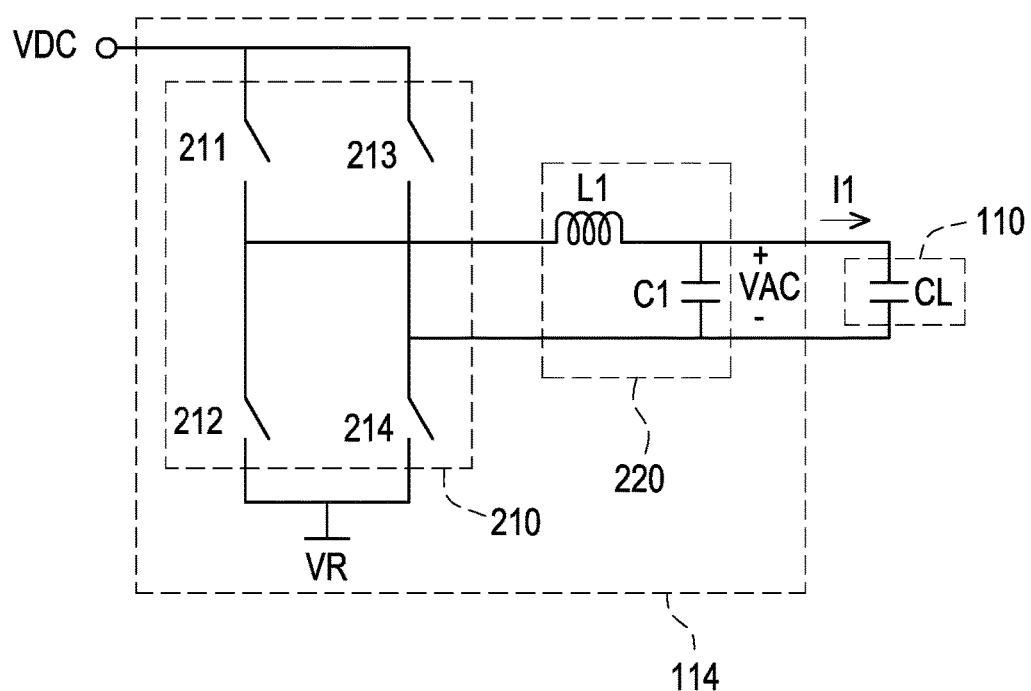
FIG. 2 is a schematic diagram of a DC/AC inverter according to another embodiment of the disclosure.

FIG. 2 is a schematic diagram of a DC/AC inverter according to another embodiment of the disclosure. An embodiment of the DC/AC inverter 114 of the power conversion circuit 106 may be, for example, as shown in FIG. 2, including a voltage conversion switch circuit 210 and a LC filter 220. The voltage conversion switch circuit 210 is coupled to the LC filter 220. The LC filter 220 is coupled to an equivalent capacitance CL of the load 110. In detail, the voltage conversion switch circuit 210 may include a voltage conversion switch 211 to a voltage conversion switch 214, the LC filter 220 may include an inductor L1 and an output capacitor C1, and the voltage conversion switch 211 to the voltage conversion switch 214 may be configured as a full bridge circuit, in which the voltage conversion switch 211 and the voltage conversion switch 212 are connected in series between the DC voltage VDC and a reference voltage VR. The voltage conversion switch 213 and the voltage conversion switch 214 are connected in series between the DC voltage VDC and the reference voltage VR. The inductor L1 is coupled to a common contact of the voltage conversion switch 211 and the voltage conversion switch 212, and is coupled to one terminal of the equivalent capacitance CL of the load 110. The other terminal of the equivalent capacitance CL of the load 110 is coupled to a common contact of the voltage conversion switch 213 and the voltage conversion switch 214.

The voltage conversion switch circuit 210 may receive the DC voltage VDC, and is controlled by the control circuit 104 to switch the conduction states of the voltage conversion switch 211 to the voltage conversion switch 214 to generate the AC output voltage VAC on the output capacitor C1.

When the load 110 is detected, the voltage conversion switch 211 to the voltage conversion switch 214 are controlled by the control circuit 104 to lower the AC output voltage VAC to the preset voltage during the preset period, and then entering the surge generation period to change to outputting the surge voltage. An initial time point of the surge generation period corresponds to the time point when the AC output voltage VAC reaches a peak voltage, and the peak value of the surge voltage generated by the power conversion circuit 106 during the surge generation period may be, for example, 1.1~1.2 times the normal peak voltage of the AC output voltage VAC, but is not limited thereto. After the surge generation period ends, the power conversion circuit 106 generates the AC output voltage VAC normally, that is, generates a sine wave with a fixed amplitude.

Figure 3A:
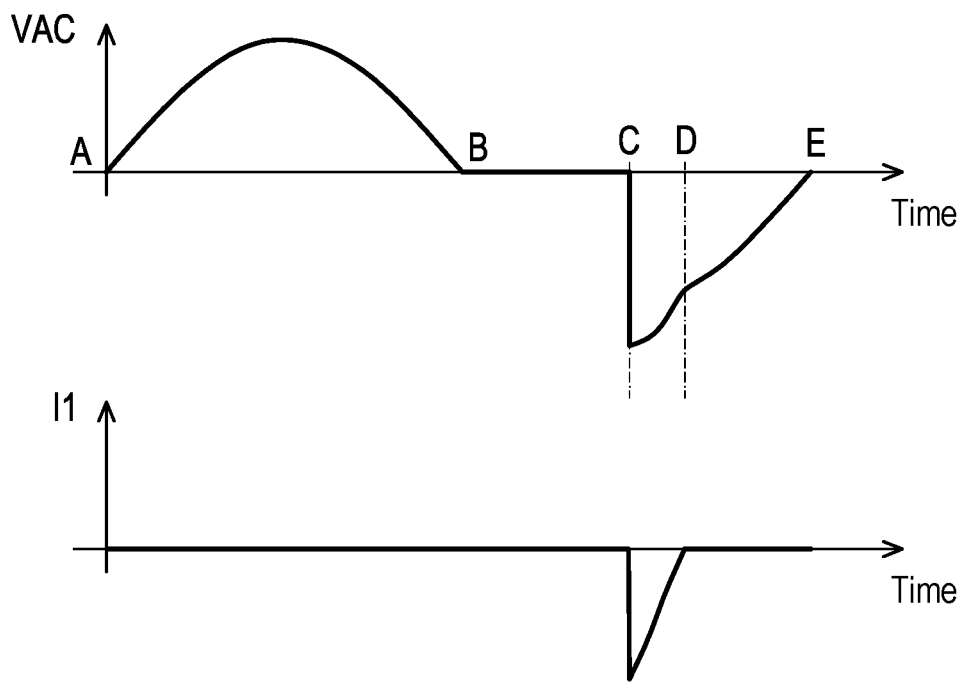
FIG. 3A to FIG. 4B are schematic diagrams of AC output voltage and current according to an embodiment of the disclosure.

For example, as shown in FIG. 3A, the control circuit 104 may control the voltage conversion switch 211 to the voltage conversion switch 214 to lower the voltage value of the AC output voltage VAC from a time point B to a time point C (the preset period) to close to 0, and change to outputting the surge voltage from the time point C to a time point D (the surge generation period). The preset period is ¼ cycle of the AC output voltage VAC, but is not limited thereto. In the case where the load 110 is coupled to the energy storage device 100, the sensing circuit 108 may sense the surge current at the time point C to the time point D, as shown in FIG. 3A. The control circuit 104 may, for example, determine whether a surge current is generated at the output terminal of the power conversion circuit according to whether the current sensed by the sensing circuit 108 is greater than a preset current. After the surge generation period ends, the power conversion circuit 106 returns to generate a normal AC output voltage VAC (e.g., the AC output voltage VAC at the time point D to a time point E).

It may be seen from FIG. 3A, although the sensing circuit 108 may not sense the current I1 during a period other than from the time point C to the time point D because the equivalent capacitance CL of the load 110 is too small, through passing from the time point C to the time point D, the DC/AC inverter 114 outputs a surge voltage, which may generate a surge current in response to the equivalent capacitance CL, so that the load 110 is determined to be in a state of being coupled to the energy storage device 100 according to the generation of the surge current.

Figure 3B:
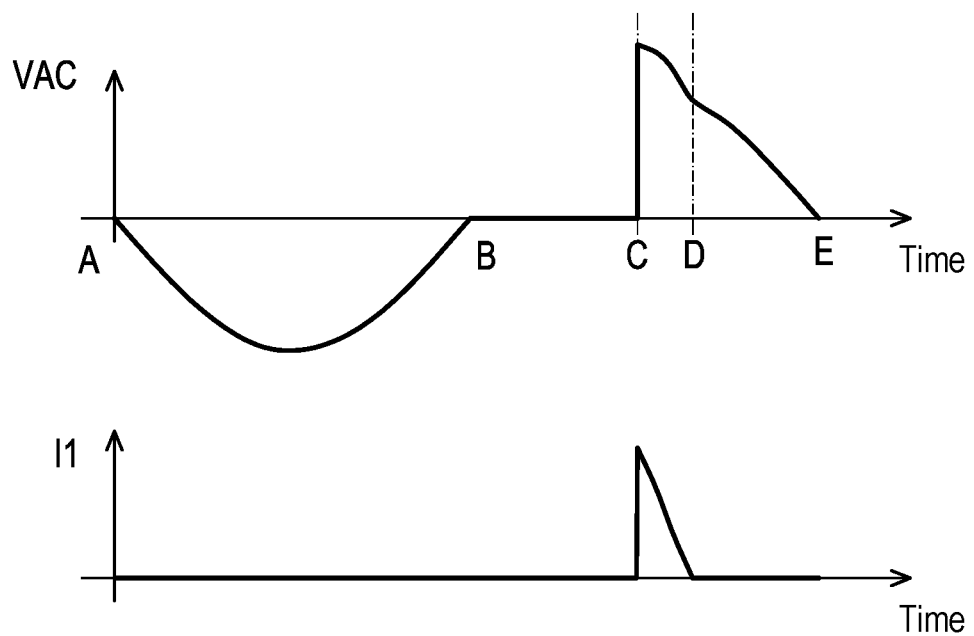

It is worth noting that, in the embodiment of FIG. 3A, the preset period is set as the time point B to the time point C in the negative half cycle of the AC output voltage VAC, but other embodiments are not limited thereto, in other embodiments, the initial time and the end time of the preset period may be set arbitrarily. For example, in the embodiment of FIG. 3B, the preset period may also be set as the time point B to the time point C in the positive half cycle of the AC output voltage VAC, which may also achieve the effect of generating a surge current in response to the equivalent capacitance CL. In addition, in other embodiments, the preset period is not limited to ¼ cycle of the AC output voltage VAC, and the designer may set the time length of the preset period according to actual requirements. In addition, the voltage value of the AC output voltage VAC during the preset period is not limited to be close to 0, it may also be set to 0 or other voltage values.

Figure 4A:
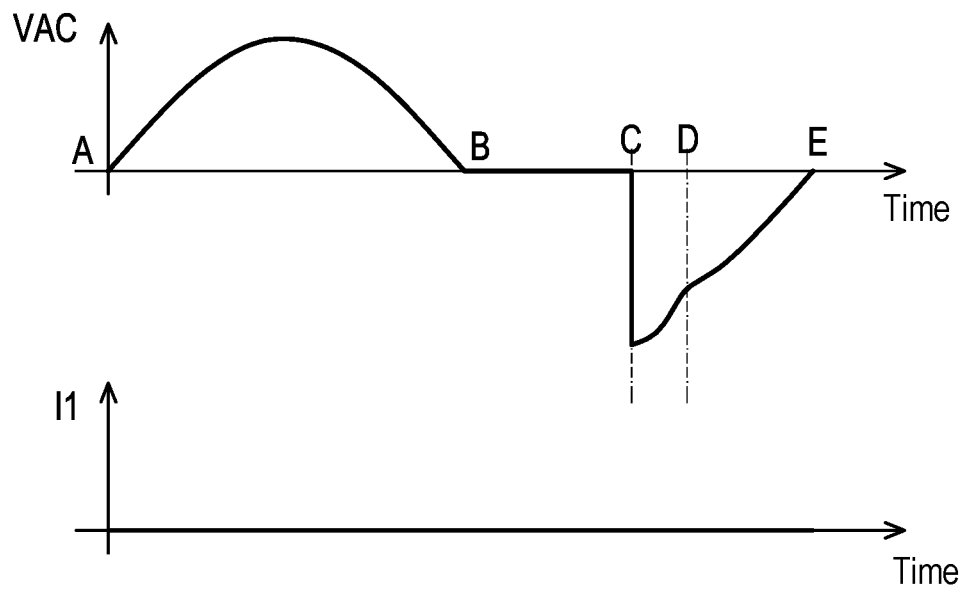
Figure 4B:
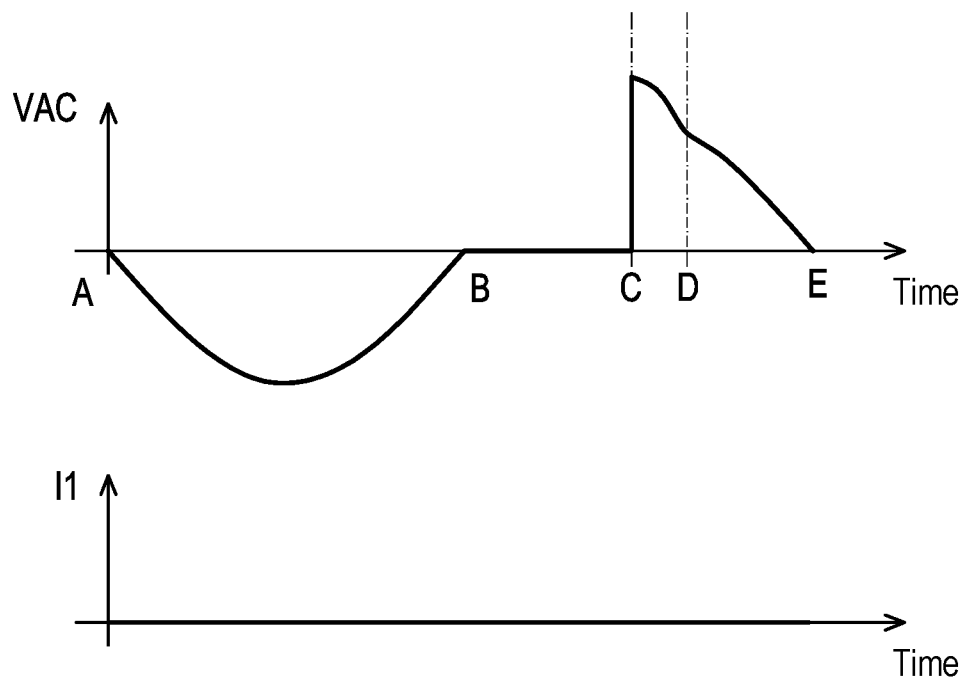

In addition, when the load 110 is not coupled to the energy storage device 100, the sensing circuit 108 may be as shown in FIG. 4A and FIG. 4B. The control circuit 104 likewise controls the voltage conversion switch 211 to the voltage conversion switch 214 to lower the voltage value of the AC output voltage VAC from a time point B to a time point C (the preset period) to close to 0, and change to outputting the surge voltage from the time point C to a time point D (the surge generation period). However, since the load 110 is not coupled to the energy storage device 100, the output terminal of the DC/AC inverter 114 is in an open-circuit state. Therefore, in the time point C to the time point D, the output terminal of the DC/AC inverter 114 does not generate a surge current, thereby, the control circuit 104 may determine the state that the load 110 is not coupled to the energy storage device 100 and may turn off the energy storage device 100 to reduce power dissipation and save the energy loss of the battery module 102.

Figure 5:
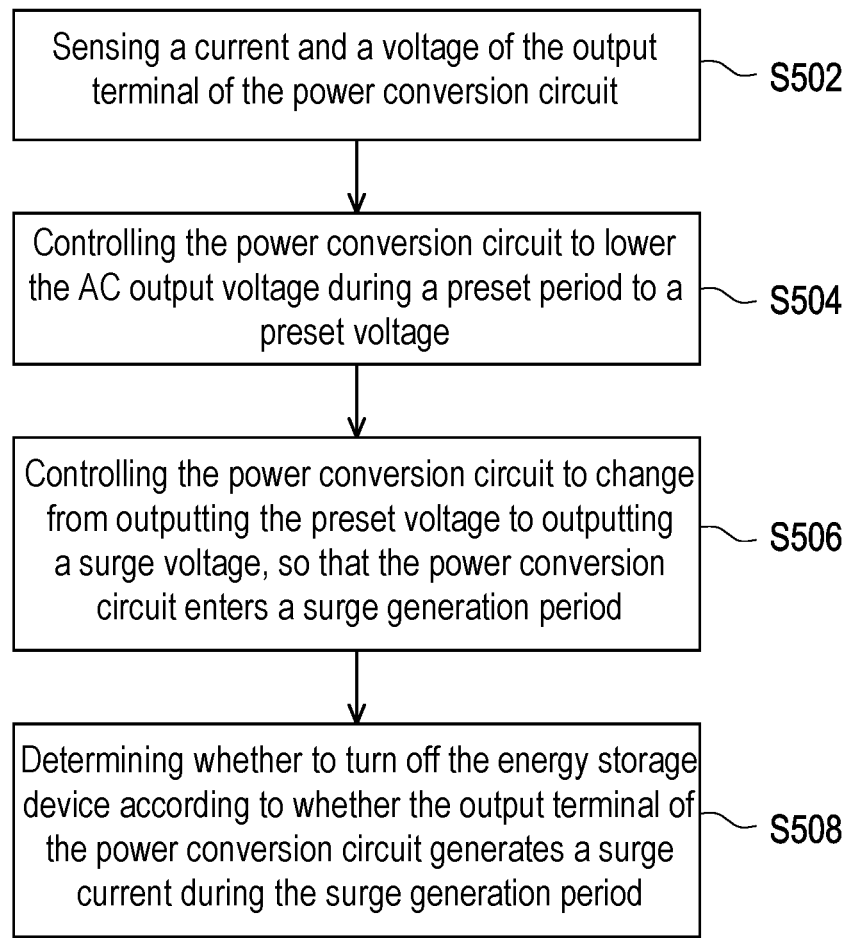
FIG. 5 is a flowchart of a method for supplying power of an energy storage device according to an embodiment of the disclosure.

FIG. 5 is a flowchart of a method for supplying power of an energy storage device according to an embodiment of the disclosure. The energy storage device includes a battery module and a power conversion circuit. The power conversion circuit converts the DC voltage provided by the battery module into an AC output voltage, so as to provide the AC output voltage to an output terminal of the power conversion circuit to supply power to the load. The AC output voltage may be generated at, for example, an output capacitor coupled to the output terminal of the power conversion circuit, and the power conversion circuit may include a DC/DC conversion circuit and a DC/AC inverter, in which the DC/AC inverter includes an output capacitor. It may be known from the above embodiments that the method for supplying power of the power supply device may include the following steps. First, the current and the voltage of the output terminal of the power conversion circuit are sensed (step S502). Further, the AC output voltage may be obtained by first boosting the DC voltage by controlling the DC/DC conversion circuit, and then controlling the DC/AC inverter to convert the boosted DC voltage. Next, the power conversion circuit is controlled to lower the AC output voltage during a preset period to a preset voltage (step S504). The preset period may be, for example, ¼ cycle of the AC output voltage, and the voltage value of the preset voltage may be, for example, close to 0, but is not limited thereto. Then, the power conversion circuit is controlled to change from outputting a preset voltage to outputting a surge voltage, so that the power conversion circuit enters a surge generation period (step S506). The initial time point of the surge generation period may, for example, corresponds to a time point that the AC output voltage reaches a peak voltage, the surge voltage generated by controlling the power conversion circuit during the surge generation period may be, for example, 1.1 to 1.2 times the normal peak voltage of the AC output voltage, but is not limited thereto. After that, it is determined whether to turn off the energy storage device according to whether the output terminal of the power conversion circuit generates a surge current during the surge generation period (step S508). The surge current is generated in response to the equivalent capacitance of the load. Therefore, whether the load is coupled to the energy storage device may be determined by determining whether the surge current is generated. For example, whether the output terminal of the power conversion circuit produces a surge current may be determined according to whether the current sensed by the sensing circuit is greater than the preset current, thereby determining whether to turn off the energy storage device. In addition, the power conversion circuit may be controlled to normally generate the AC output voltage after the surge generation period ends.

To sum up, the embodiments of the disclosure may control the power conversion circuit to lower the AC output voltage during a preset period to a preset voltage. The power conversion circuit is controlled to change from outputting the preset voltage to outputting a surge voltage, so that the power conversion circuit enters a surge generation period, and whether to turn off the energy storage device is determined according to whether an output terminal of the power conversion circuit generates a surge current during the surge generation period. In this way, whether a load has been removed from the energy storage device may be accurately determined, and the energy storage device may be automatically turn off when the load is removed from the energy storage device, thereby effectively reducing power loss.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An energy storage device, comprising:
   a battery module, providing a DC voltage;
   a power conversion circuit, coupled to the battery module and converting the DC voltage into an AC output voltage, to provide the AC output voltage to an output terminal of the power conversion circuit to supply power to a load;
   a sensing circuit, coupled to the output terminal of the power conversion circuit, sensing a current and a voltage of the output terminal of the power conversion circuit; and
   a control circuit, coupled to the power conversion circuit and the sensing circuit, controlling the power conversion circuit to lower the AC output voltage during a preset period to a preset voltage, and controlling the power conversion circuit to change from outputting the preset voltage to outputting a surge voltage, such that the power conversion circuit enters a surge generation period, the control circuit determining whether to turn off the energy storage device according to whether the output terminal of the power conversion circuit generates a surge current during the surge generation period, wherein the control circuit controls the surge voltage generated by the power conversion circuit during the surge generation period to be greater than a normal peak voltage of the AC output voltage.

2. The energy storage device according to claim 1, wherein the surge current is generated in response to an equivalent capacitance of the load.

3. The energy storage device according to claim 1, wherein an initial time point of the surge generation period corresponds to a time point when the AC output voltage reaches a peak voltage.

4. The energy storage device according to claim 1, wherein the preset period is ¼ cycle of the AC output voltage.

5. The energy storage device according to claim 1, wherein a voltage value of the preset voltage is close to zero.

6. The energy storage device according to claim 1, wherein the control circuit determines whether the surge current is generated at the output terminal of the power conversion circuit according to whether the current sensed by the sensing circuit is greater than a preset current.

7. The energy storage device according to claim 1, wherein the control circuit controls the surge voltage generated by the power conversion circuit during the surge generation period to be 1.1 to 1.2 times of the normal peak voltage of the AC output voltage.

8. The energy storage device according to claim 1, wherein the control circuit controls the power conversion circuit to normally generate the AC output voltage after the surge generation period ends.

9. A method for supplying power of an energy storage device, the energy storage device comprising a battery module and a power conversion circuit, the power conversion circuit converting a DC voltage provided by the battery module into an AC output voltage, to provide the AC output voltage to an output terminal of the power conversion circuit to supply power to a load, the method for supplying power of the energy storage device comprising:
   sensing a current and a voltage of the output terminal of the power conversion circuit;
   controlling the power conversion circuit to lower the AC output voltage during a preset period to a preset voltage;
   controlling the power conversion circuit to change from outputting the preset voltage to outputting a surge voltage, so that the power conversion circuit enters a surge generation period;
   controlling the surge voltage generated by the power conversion circuit during the surge generation period to be greater than a normal peak voltage of the AC output voltage; and
   determining whether to turn off the energy storage device according to whether the output terminal of the power conversion circuit generates a surge current during the surge generation period.

10. The method for supplying power of the energy storage device according to claim 9, wherein the surge current is generated in response to an equivalent capacitance of the load.

11. The method for supplying power of the energy storage device according to claim 9, wherein an initial time point of the surge generation period corresponds to a time point when the AC output voltage reaches a peak voltage.

12. The method for supplying power of the energy storage device according to claim 9, wherein the preset period is ¼ cycle of the AC output voltage.

13. The method for supplying power of the energy storage device according to claim 9, wherein a voltage value of the preset voltage is close to zero.

14. The method for supplying power of the energy storage device according to claim 9, comprising:
   determining whether the surge current is generated at the output terminal of the power conversion circuit according to whether the current sensed by the sensing circuit is greater than a preset current.

15. The method for supplying power of the energy storage device according to claim 9, wherein the surge voltage generated by the power conversion circuit during the surge generation period is controlled to be 1.1 to 1.2 times of the normal peak voltage of the AC output voltage.

16. The method for supplying power of the energy storage device according to claim 9, comprising:
   controlling the power conversion circuit to normally generate the AC output voltage after the surge generation period ends.

* * * * *